A. T. STURT.
HUB RETAINER FOR WHEELS.
APPLICATION FILED JAN. 9, 1915.

1,146,370.

Patented July 13, 1915.

WITNESSES
Frank Eufimia
John J. Flanagan

INVENTOR
Alfred T. Sturt
BY
Cornelius C. Billings
ATTORNEY

UNITED STATES PATENT OFFICE.

ALFRED T. STURT, OF FLINT, MICHIGAN, ASSIGNOR TO CHEVROLET MOTOR COMPANY OF NEW YORK, INC., OF NEW YORK, N. Y., A CORPORATION OF NEW YORK.

HUB-RETAINER FOR WHEELS.

1,146,370.  Specification of Letters Patent.  Patented July 13, 1915.

Application filed January 9, 1915. Serial No. 1,269.

*To all whom it may concern:*

Be it known that I, ALFRED T. STURT, a citizen of the United States of America, and a resident of the city of Flint, county of Genesee, and State of Michigan, have invented certain new and useful Improvements in Hub-Retainers for Wheels; and I do hereby declare the following to be a full, clear, and exact description thereof.

This invention relates to wheel constructions especially adapted for use in automobiles.

One of the objects of the invention is to provide in a wheel an improved hub construction and means for attaching a hub cap or finishing nut to the hub.

Other objects will appear from the subjoined description and claims.

The invention consists in the construction and combination of parts hereinafter more particularly described and claimed.

Figure 1:
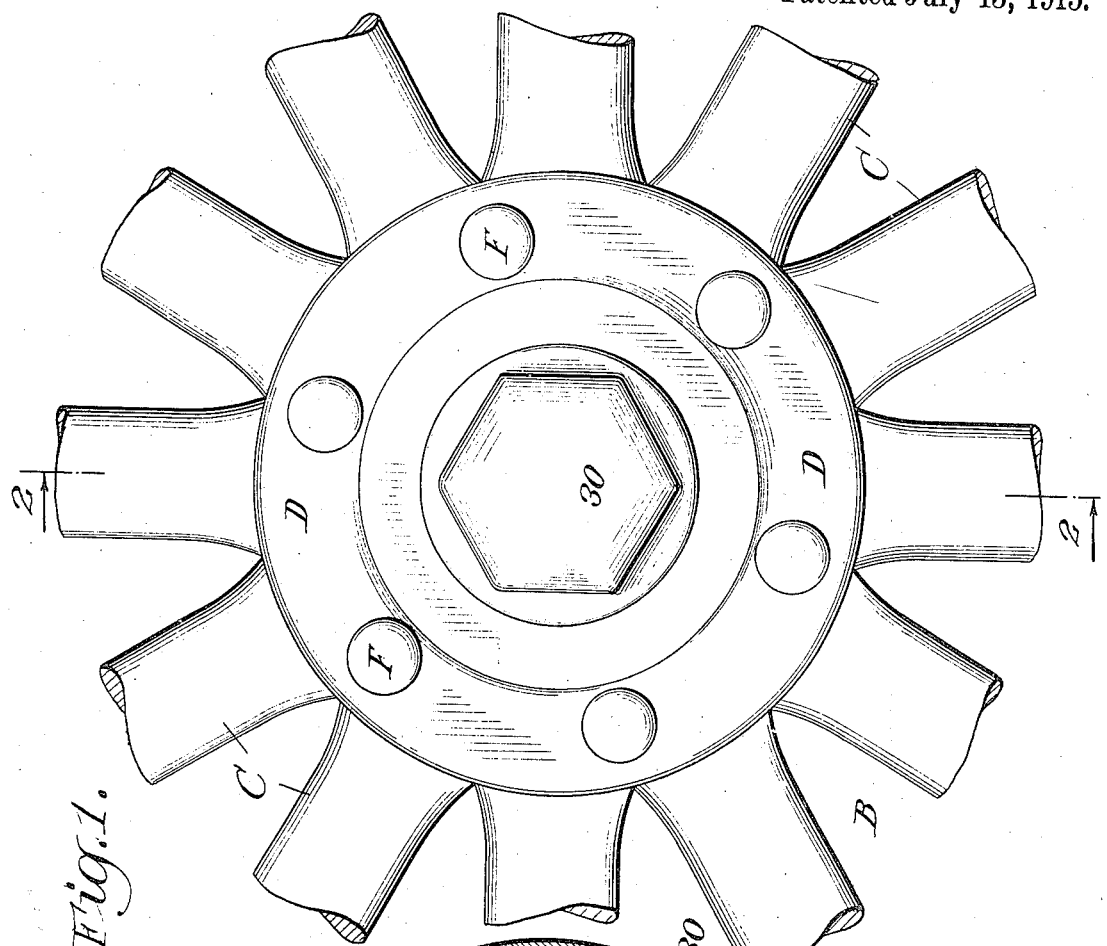
Figure 2:
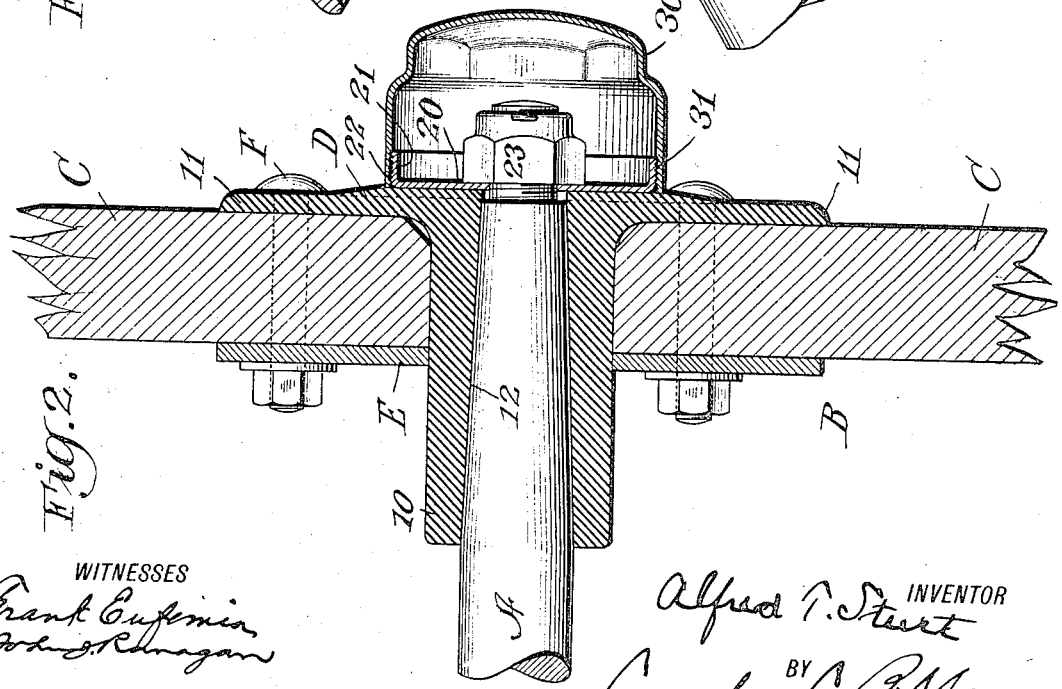

Referring to the drawings; Figure 1., is a front view of my improved hub construction, the spokes of the wheel being shown broken away. Fig. 2., is a sectional view on line 2—2 of Fig. 1., the axle and its securing nut being shown in elevation.

Similar reference characters indicate like parts in the various figures of the drawing.

A is an axle of an automobile or other vehicle, B the wheel consisting of spokes C secured to a hub D. A concentric plate E is fitted over the shank of the hub and secured to the spokes and flange of the hub by means of bolts F. The hub D consists of a longitudinal hollow central portion 10 which extends a substantial distance inward to form a suitable bearing and a flange 11 extends upward from one side thereof. Through the center of the longitudinal portion 10 extends a bearing 12 which is conical in shape and which is constructed to fit nicely over the axle A. The front surface of the hub is substantially a plane and in continuation with the plane of the front face of the flange. The end of the axle is screw-threaded. Fitting over the screw-threaded end is a flanged metal plate or washer 20 which may be either of sheet metal or of cast or wrought metal and may be made in any suitable way. The outer edge of the washer is turned over to form an outwardly extending flange 21 and is screw-threaded at 22. A nut 23 is screwed on to the threaded end of the axle as shown in Fig. 1 and preferably locked in place. When in place the nut 23 holds the flanged plate or washer 20 up against the smooth outer face of the flanged hub. The conventional hub cap or casing 30 is screw-threaded at 31 on the inner edge thereof and is by this means screwed on to the screw-threaded flange of the washer.

Many advantages accrue through my invention. One advantage of the construction of the hub as shown and described, over the previous known constructions is to eliminate the projecting portions of the hub outside of the wheel. My construction is much lighter and much less expensive to manufacture. The threaded ends on the solid hubs of the previously known constructions are often damaged in the process of manufacture, painting, mounting and testing of cars. In my construction, the threaded washers can be easily and without great cost, replaced if damaged, while the replacing of a hub is difficult. This invention may also be applied with advantage to raised or extending hubs by securing to the ends thereof the threaded washer in the manner described and securing to the washer in the way shown the usual hub cap or casing instead of screwing the hub or casing to the screw-threads which have usually been placed upon the raised hubs.

While I have shown certain features of my invention in the accompanying drawings, it is to be understood that said drawings are merely illustrative, and that I am not confined to what is there shown and herein described in connection therewith, except as may be specifically set forth in the claims.

Having now described my invention, what I claim as new and desire to secure by Letters Patent, is:—

1. The combination in a wheel of a hub, a washer having screw-threads at its edge removably held in place on the hub, and a hub cap casing removably secured to the washer.

2. The combination with an axle, of a wheel provided with a hub having a flat surface, a flanged washer loosely fitting over the axle and removably secured against the outer surface of the hub and a hub cap removably secured to the flange of the washer.

3. The combination of an axle, a wheel, a flanged hub mounted thereupon, a flanged washer, means for securing the hub to the axle and the flanged washer to the hub, and a hub cap removably secured to the flange of the washer.

4. The combination of an axle, a flanged hub, a flanged washer loosely mounted on said axle, means for securing the hub to the axle and the washer to the hub, a hub cap, screw-threads on the flange of the washer, screw-threads on the hub cap, the hub cap being held to the flange of the washer by the said screw-threads.

5. The combination in a wheel, an axle, a hub, a flanged washer, said hub and washer loosely mounted on the axle, means for securing the hub to the axle and the washer to the hub, a hub cap, screw-threads on the outer surface of the flange of the washer, screw-threads on the inner surface of the hub cap, the hub cap being held to the flange of the washer by the said screw-threads.

In witness whereof, I have hereunto set my hand at the borough of Manhattan, city and State of New York, this 26th day of December, 1914.

ALFRED T. STURT.

In presence of—
ARTHUR C. MASON,
JOHN J. RANAGAN.